United States Patent [19]

Takemoto et al.

[11] Patent Number: 4,487,872
[45] Date of Patent: Dec. 11, 1984

[54] REPOSITIONABLE PRESSURE-SENSITIVE ADHESIVE COMPOSITION

[75] Inventors: George S. Takemoto, Dedham, Mass.; Joseph A. Boudreau, Barrington, Ill.

[73] Assignee: The Kendall Company, Boston, Mass.

[21] Appl. No.: 511,708

[22] Filed: Jul. 7, 1983

[51] Int. Cl.$^3$ .................................................. C08K 5/52
[52] U.S. Cl. ...................................... 524/127; 524/125
[58] Field of Search ................ 524/127, 559, 560, 561

[56] References Cited

U.S. PATENT DOCUMENTS

| | | | |
|---|---|---|---|
| 3,300,543 | 1/1967 | Turner | 525/58 |
| 4,207,224 | 6/1980 | Randell et al. | 524/127 |
| 4,343,732 | 8/1982 | Zama et al. | 524/127 |

Primary Examiner—Joseph L. Schofer
Assistant Examiner—J. M. Reddick
Attorney, Agent, or Firm—Frederick R. Cantor

[57] ABSTRACT

The present invention discloses a novel readily removable and repositionable pressure-sensitive adhesive composition especially suitable for thin adhesive film applications to the surface of paper or other laminar backing materials, for easy application and removal of the laminar backing to a variety of substrate surfaces, which comprises: (1) a carboxyl-modified vinyl chloride-vinyl acetate copolymer; (2) a polymeric polyester plasticizer; and (3) a halo-organophosphorous plasticizer. In the present novel repositionable pressure-sensitive adhesive composition, the desired tack or adhesive bonding strength is selectively controlled by adjusting the relative concentration ratios of the halo-organophosphorous plasticizer and the polyester plasticizer in combination with the vinyl chloride-vinyl acetate copolymer.

14 Claims, 1 Drawing Figure

REPOSITIONABLE PRESSURE-SENSITIVE ADHESIVE COMPOSITION

BACKGROUND OF THE INVENTION

The present invention relates to improved pressure-sensitive adhesive compositions.

The present invention further relates to improved readily removable and repositionable pressure-sensitive adhesive compositions.

The present invention also further relates to a readily removable and repositionable polymeric based pressure-sensitive adhesive composition incorporating a halo-organophosphorous plasticizer.

The present invention still further relates to a readily removable and repositionable polymeric-based pressure-sensitive adhesive composition that is suitable for thin adhesive film applications to paper, or other laminar backing materials, for easy application to and removal from a variety of substrate surfaces.

A pressure-sensitive adhesive that is to be used in the thin adhesive film applications of the present invention must exhibit characteristics of good tensile strength and cohesion, and must possess sufficient adhesiveness or tack, in order to bind a laminar backing material to a substrate surface upon the application of pressure. Further, it must be removable from the other substrate surface without the deposition of a gummy adhesive residue and without damage to the substrate surface.

It is well known in the adhesive art that certain copolymers or copolymer blends are useful as adhesives. Removable or repositionable pressure-sensitive adhesive compositions, based on a plasticized polyvinyl chloride polymer or polyvinyl chloride/polyvinyl acetate copolymer have been in existence for quite some time. U.S. Pat. No. 3,300,543, issued to Turner, describes such an adhesive composition.

In addition, there are on the market, vinyl films having a coating exhibiting a very low tack characteristic, which will readily adhere to and be removable from a variety of very smooth substrate surfaces.

However, when paper labels, or the like laminar backing materials, which are coated on one side with these prior art adhesive compositions, are applied to a paper or another laminar substrate surface having low delamination strength, either the paper label won't readily adhere to the paper, or other substrate surface, or alternatively, it becomes very difficult to remove the label after a brief period of contact time, without tearing the label and/or the substrate paper.

Tack may be described as a measure of the strength or agressiveness with which an adhesive bonds to a surface. The Polyken Probe Tack Tester ® (trademark for apparatus for measuring tack made by The Kendall Company), which measures the 'unbonding' strength of an adhesive from a stainless steel probe surface after a short dwell time on that surface. Tack will vary not only with dwell time, but also with the nature of the adherent surface (i.e. glass, paper, skin, etc.), as well as the finish of the surface (i.e. smooth, matte, wet, etc.). The amount of pressure that is required to be applied in order to form the adhesive bond is also important.

Peel strength, on the other hand, is the unbonding strength measured after a longer dwell time of the adhesive on a surface. One standard method applies a pressure of a 4.5 pound rubber roller and a dwell time of 15 minutes ±5 minutes. The adhesive tape is then peeled away at a rate of 12 inches per minute, and at a 180° angle.

In the present invention, it has been a desirable object to maximize the tack meanwhile maintaining a certain minimum peel value, such that the laminar backing material will not "butterfly", or peel off the substrate, before sufficient adhesive bond strength is achieved.

On the other hand, in certain applications, a maximum peel strength value may be desirable so that the laminar backing will not cause delamination of the application surface during the unbonding process. On the other hand, if the strength of the laminar backing and the substrate surface is strong enough, peel strength values could be higher in order to maintain good removability of the tape.

The proper balance of adhesion and tack with ready removability (peel) of the laminar backing material has been found to be difficult to achieve.

In the present invention, it has been surprisingly determined that by incorporating optimal concentration ratios of a polyester plasticizer and a halo-organophosphorous plasticizer into a plasticized vinyl copolymer, here a copolymer of vinyl chloride-vinyl acetate, better cohesive control with desired plasticity and preferred tack characteristics of the resultant pressure-sensitive adhesive composition could be readily achieved.

It was further found that high concentrations of the polymeric polyester plasticizer component, along with low concentrations of the halo-organophosphorous plasticizer component, resulted in a pressure-sensitive adhesive having high tack; however, poor cohesive strength also resulted. In contra-distinction, in a composition having a high concentration of the halo-organophosphorous plasticizer component, and low concentrations of the polymeric polyester plasticizer component, an essentially nontacky adhesive, having a good cohesive strength, was obtained.

The present invention has resulted in the determination of the optimum concentration ratio of both the polyester plasticizer and halo-organophosphorous plasticizer components in the pressure-sensitive adhesive in order to produce an adhesive film composition having the optimum balance of tack, adhesion, film integrity, softness, and removability.

SUMMARY OF THE INVENTION

An object of the present invention is to provide an improved pressure-sensitive adhesive composition.

A further object of the present invention is to provide an improved readily removable and repositionable pressure-sensitive adhesive composition.

It is still yet a further object of the present invention to provide an improved readily repositionable and removable polymeric-based pressure-sensitive adhesive composition incorporating a halo-organophosphorous plasticizer.

Yet another object of the present invention is to provide a readily removable and repositionable pressure-sensitive adhesive composition that is suitable for thin film applications to paper or other laminar backing materials, for easy application and removal of adherent from a variety of substrate surfaces.

Still yet another object of the present invention is to provide an improved readily removable and repositionable pressure-sensitive adhesive composition that is at once both economical to manufacture and convenient to use.

In order to accomplish the aforestated objectives, and others as well, a readily removable and repositionable pressure-sensitive adhesive composition especially suitable for thin adhesive film applications to the surface of paper or other laminar backing materials, for easy application and removal to a variety of substrate surfaces is described which comprises: (1) a carboxyl modified vinyl acetate-vinyl chloride copolymer; (2) a polymeric polyester plasticizer; and (3) a halo-organophosphorous plasticizer. The tack of the adhesive composition is selectively controlled by adjusting the relative concentration ratios of the halo-organophosphorous plasticizer and the polyester plasticizer in combination with the vinyl acetate-vinyl chloride copolymer.

DESCRIPTION OF THE PREFERRED EMBODIMENT

Figure 1:
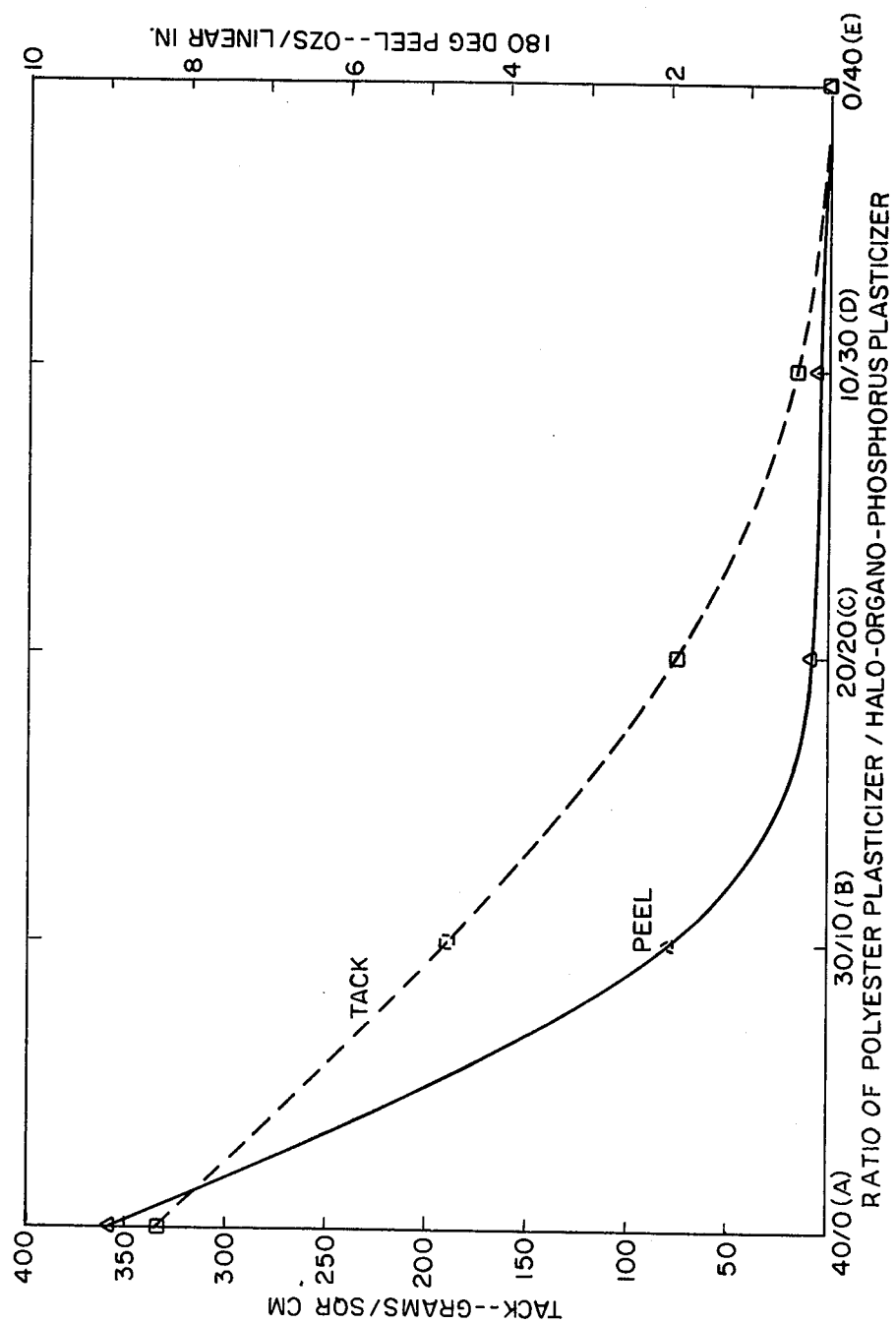
FIG. 1, is a graph illustrating the relationship between varying concentration ratios of the polymeric polyester plasticizer and the halo-organophosphorous plasticizer in a constant concentration of vinyl copolymer, showing the resultant tack (dotted line) and peel (solid line) values of the pressure-sensitive adhesive composition at the selected plasticizer concentration ratios described in Table I.

In accordance with the present invention, the repositionable pressure-sensitive adhesive composition comprises the following components: (1) a carboxyl modified vinyl acetate-vinyl chloride copolymer; (2) a polymeric polyester plasticizer; and, (3) a halo-organophosphorous plasticizer. The above three components are dissolved in a suitable organic solvent.

The carboxyl modified vinyl acetate-vinyl chloride copolymer component utilized in the present invention is UCAR VMCH ® (a vinyl copolymer manufactured and sold by Union Carbide Co.). It is a medium molecular weight resin copolymer, having an average molecular weight of about 21,000, containing approximately 86 percent vinyl chloride, 13 percent vinyl acetate, and 1 percent maleic acid. The copolymer resin as employed here is dissolved in a relatively strong solvent combination, being preferably 50 percent toluene/50 percent acetone admixture.

The copolymer is present in the present invention in a concentration range of from about 15 to about 30 percent by weight solids. The preferred concentration range of the copolymer as employed here is from about 18 to about 28 percent by weight solids.

The polymeric polyester plasticizer component as utilized in the present invention is PARAPLEX ® G-54 (an intermediate molecular weight polyester plasticizer manufactured and sold by Rohm and Haas Company). It is an intermediate molecular weight polyester plasticizer, having an average molecular weight of about 3,300, being particularly useful as a permanent plasticizer for PVC. The polymeric polyester plasticizer is present in the present invention in a concentration range of from about 35 to about 50 percent by weight solids. The preferred concentration range of the polyester plasticizer employed here is from about 38 to about 45 percent by weight solids.

The halo-organophosphorous plasticizer of the present invention is FYROL ® 99 (manufactured by Stauffer Chemical Company). FYROL ® 99 is a chlorinated oligomeric phosphate ester having a high phosphorous and chlorine content, and has been used previously in flame retardant additive applications. The halo-organophosphorous plasticizer in the present invention is present in a concentration range of from about 35 to about 50 percent by weight solids. The preferred concentration range of the halo-organophosphorous plasticizer is from about 38 to about 45 percent by weight solids.

The above-described pressure-sensitive adhesive components are formed into a dry, but suitable tacky, pressure-sensitive adhesive formulation, which is generally utilized in the form of a thin (i.e., generally less than a 0.25 mm layer). The repositionable pressure-sensitive adhesive product, being pressure-sensitive adhesive thin film, is applied to a laminar backing. The liquid adhesive formulation after application to a desired laminar backing is then dried in order to remove the excess organic solvent therefrom.

Table I below depicts a series of representative repositionable pressure-sensitive adhesive formulations, according to the present invention.

TABLE I

|  | A *(40/0) | B (30/10) | C (20/20) | D (10/30) | E (0/40) |
|---|---|---|---|---|---|
| Vinyl Copolymer | 10 | 10 | 10 | 10 | 10 |
| Halo-organophosphorous Plasticizer | — | 10 | 20 | 30 | 40 |
| Polyester Plasticizer | 40 | 30 | 20 | 10 | — |
| Toluene | 40 | 40 | 40 | 40 | 40 |
| Acetone | 10 | 10 | 10 | 10 | 10 |
| Probetack (grams/CM²) | 335 | 190± | 76 | 16 | 0 |
| 180° Peel (Ozs./Lin. Inch) | 9 | 2± | 0.21 | 0.17 | 0 |

*Percent parts by weight.

The individual components of the pressure-sensitive adhesive formulation of the present invention are listed in the lefthand column. To the right of the individual components are five selected formulations; and the percent parts by weight of each component for all the formulations. It should be noted that the adhesive compositions A,C,D and E were actually prepared and individually studied, whereas formulation B represents an extrapolated (non-experimental) value.

Below the dotted line in Table 1 are the values derived for probe tack (grams/cm²) as well as the 180° peel (Oz./Lin. Inch) values. Again, it should be noted that the values for formulation B are extrapolated (non-experimental) values.

FIG. 1, is a graph illustrating the relationship between varying concentration ratios of the polymeric polyester plasticizer and the halo-organophosphorous plasticizer in a constant concentration of vinyl copolymer, showing the resultant tack (dotted line) and peel (solid line) values of the pressure-sensitive adhesive composition at the selected plasticizer concentration ratios described in Table I.

It should be noted that a clear, almost linear relationship exists between the tack values experimentally obtained and the relative concentration ratios of the polyester/halo-organophosphorous plasticizers. As the percent of the halo-organophosphorous plasticizer component increases, the resultant tack values correspondingly decreases, and vice versa.

Further, as the polyester plasticizer component decreases, the 180° peel values are noted to decrease sharply.

Various applications may require an appropriate adjustment of the polyester/halo-organophosphorous plasticizer ratio, in order to attain the desired tack and peel values in a specific adhesive formulation.

With common tablet paper as a backing laminar material, we have found a narrow preferred optimal concentration range in the formulation as described in this invention. Approximately 18 to 28 percent vinyl copolymer UCAR Vinylite ® VMCH (vinyl acetate-vinyl chloride copolymer) and 76 to 90 percent combined plasticizer. The combined plasticizer consists of a mixture of the Paraplex ® G-54 (the polyester plasticizer) and FYROL ® 99 (the halo-organophosphorous plasticizer). The preferred combined plasticizer mixture concentration ratio is 50 percent polyester plasticizer and 50 percent halo-organophosphorous plasticizer (represented by the 20/20 (C) ratio point on the graph) percent by weight.

Of course, if other laminar material backings are used, such as a polyester film backing which is then applied to a glass or steel substrate, higher percentage concentrations of the polyester plasticizer could be utilized in order to provide higher adhesive bond strength, i.e. more agressiveness, while still maintaining good removability characteristics, i.e. peel, even after long dwell times.

As discussed, the probe tack characteristic was determined by means of a Polyken Probe Tack Tester ®, as described in U.S. Pat. No. 3,214,971. The tester has the following four functional parts: (1) a cylindrical steel probe attached to the compression loaded spring; (2) a series L Hunter mechanical force gauge (Hunter Spring Company, Brochure 750/FG, revised February 1961), (3) an annulus having an opening slightly larger than the diameter of the probe; and (4) a carrier for the annulus which moves down to bring the annulus around the probe and then up to remove the annulus therefrom. The carrier moves at a speed of 0.1 inch per second.

At the beginning of the test, the carrier is at its uppermost point of travel and the annulus rests upon the carrier so that the opening in the annulus is in line with the probe positioned beneath it. In carrying out the test, a strip of tape is placed upon the annulus, adhesive side down, and spanning the annulus opening. As the carrier is driven downwardly by the synchronous motor, the adhesive surface exposed through the opening is brought into contact with the flat surface of the probe so that the tape and the annulus attached thereto are suspended on the probe as the carrier continues farther on its downward path. The carrier then reverses its movement returning to pick up the annulus, thereby separating the tape from the probe surface. Separation begins after one second contact between the probe and the adhesive. The force required to separate the tape from the probe is recorded on a gauge. The recorded value is the probe tack value. Measurements were made employing a loading of 500 g/cm$^2$.

The previous detailed description of the preferred embodiment of the present invention is given for purposes of clarity of understanding only, and no unnecessary limitations should be understood or implied therefrom, as such functions and equivalents may be obvious to those skilled in the art pertaining thereto.

The following example further illustrates the present invention:

EXAMPLE I

An exemplary embodiment of the repositionable pressure-sensitive adhesive composition of the present invention was prepared as follows:

In a suitable mixing vessel, 450 grams of toluene was added. This was followed by the addition and mixing of 240 grams of UCAR vinylite VMCH ® (a trademark for a carboxyl-modified vinyl chloride-vinyl acetate copolymer made by Union Carbide Co.). Then 480 grams of Fyrol ® 99 (a trademark for a halogenated organophosphorous plasticizer made by Stauffer Chemical Company) is added to the mixture. This was then followed by the addition of Paraplex ® G-54 (a tradename for a polyester plasticizer made by Rohm and Haas Company) with stirring until all the solids were well dissolved. The mixture was then continually stirred while adding 450 ml of acetone until the mixture is free of all undissolved solids.

The above formulation is then utilized as a repositionable pressure-sensitive adhesive for thin film applications. The adhesive was then applied to a 1.5 mil mylar sheet with a 0.016" wire round rod in order to give a coating thickness of approximately 0.5 to 0.8 mils.

What is claimed is:

1. A readily removable and repositionable pressure-sensitive adhesive composition in a suitable organic solvent, comprising:
    (a) a carboxyl modified vinyl acetate-vinyl chloride copolymer, further comprising of from about 86 percent of vinyl chloride, about 13 percent vinyl acetate and about 1 percent of maleic acid;
    (b) a polymeric polyester plasticizer; and
    (c) a halo-organophosphorous plasticizer, being a chlorinated oligomeric phosphate ester.

2. A pressure-sensitive adhesive composition as described in claim 1, wherein the carboxyl modified vinyl acetate-vinyl chloride copolymer consists essentially of a medium molecular weight resin composition having an average molecular weight of about 21,000.

3. A pressure-sensitive adhesive composition, as described in claim 1, wherein the polymeric polyester plasticizer comprises an intermediate molecular weight plasticizer.

4. A pressure-sensitive adhesive composition, as described in claim 1, wherein the halo-organophorous plasticizer comprises a chlorinated organophosphorous plasticizer.

5. A pressure-sensitive adhesive composition, as described in claim 1, wherein the vinyl acetate-vinyl chloride copolymer is present in a concentration range of from about 15 to about 30 percent by weight.

6. A pressure-sensitive adhesive composition, as described in claim 1, wherein the vinyl acetate-vinyl chloride copolymer is present in a preferred concentration range from about 18 to about 25 percent by weight.

7. A pressure-sensitive adhesive composition, as described in claim 1, wherein the polyester plasticizer is present in a concentration range of from about 35 to about 50 percent by weight.

8. A pressure-sensitive adhesive composition, as described in claim 1, wherein the polyester plasticizer is present in a preferred concentration range of from about 38 to about 45 percent by weight.

9. A pressure-sensitive adhesive composition, as described in claim 4, wherein the chlorinated organophosphorous plasticizer is present in a concentration range of from about 35 to about 50 percent by weight.

10. A pressure-sensitive adhesive composition, as described in claim 4, wherein the chlorinated organophosphorous plasticizer is present in a preferred concentration range from about 38 to about 45 percent by weight.

11. A readily removable and repositionable pressure-sensitive adhesive composition in a suitable organic solvent, essentially comprising:
   (a) a carboxyl modified vinyl acetate-vinyl chloride copolymer;
   (b) an intermediate molecular weight polymeric polyester plasticizer having an average molecular weight of about 3,300;
   (c) a chlorinated organophosphorous plasticizer.

12. A pressure-sensitive adhesive composition, as described in claim 11, wherein the vinyl acetate-vinyl chloride copolymer is present in a preferred concentration range from about 18 to about 25 percent by weight.

13. A pressure-sensitive adhesive composition, as described in claim 11, wherein the polyester plasticizer is present in a preferred concentration range from about 38 to about 45 percent by weight.

14. A pressure-sensitive adhesive composition, as described in claim 11, wherein the chlorinated organophosphorous plasticizer is present in a preferred concentration range from about 38 to about 45 percent by weight.

* * * * *